Jan. 20, 1970 J. L. DE KROES 3,491,208

SWITCHING NETWORK HAVING A NEGATIVE RESISTANCE DEVICE

Filed April 27, 1966

INVENTOR.
JAN L.DE KROES

BY

AGENT

United States Patent Office 3,491,208 Patented Jan. 20, 1970

3,491,208

SWITCHING NETWORK HAVING A NEGATIVE RESISTANCE DEVICE

Jan Louis de Kroes, Hilversum, Netherlands, assignor, by mesne assignments, to U.S. Philips Corporation, New York, N.Y., a corporation of Delaware Filed Apr. 27, 1966, Ser. No. 545,589
Claims priority, application Netherlands, May 5, 1965, 6505715
Int. Cl. H04m 3/00
U.S. Cl. 179—18 6 Claims

ABSTRACT OF THE DISCLOSURE

An automatic telephone switching exchange has a negative resistance device associated with each cross point. The device can have two transistors of opposite conductivity type coupled with respective collectors to respective bases. Each device connects the relays of corresponding channels serially together. When a channel is occupied the devices are bypassed.

The invention relates to a switching network for use in an automatic communication exchange, particularly an automatic telephone exchange comprising a plurality of switching stages having each a plurality of cross point switches and being interconnected by intermediate lines, whilst in each cross point switch the incoming input lines or the intermediate lines cross the outgoing intermediate lines and the outgoing lines respectively at cross points, to each of which a plurality of cross point contacts and at least one cross point coil for the control thereof are associated.

Switching networks of the kind set forth have been proposed, in which connection paths between inputs and outputs of the switching network are found and selected by means of a network of search wires associated with the switching network and arranged in parallel with the intermediate lines and interconnected at junction corresponding to the cross point switches.

The invention has for its object to provide a switching network of the aforesaid kind in which with an extremely simple technical construction finding, selecting and holding of connection paths are carried out by means of the same network of control-wires already provided for holding connection paths (*c*-wires).

A switching network according to the invention is characterized in that the control-wires of the intermediate lines arriving at a cross-point switch on the one hand directly cross the control-wires of the outgoing intermediate lines or the output and on the other hand indirectly cross the control-wires of the outgoing intermediate lines or output lines through controllable elements of negative resistance characteristics individually associated with the incoming intermediate lines, each being cut off when the associated intermediae line is busy, at cross points, in each of which the series combination of a cross-point contact and a crosspoint coil is connected between the directly crossing control-wires and the series combination of a cross-point coil and a cross-point decoupling element is connected between the control-wires crossing each other through an individual controllable element of negative resistance characteristic associated with the incoming intermediate line.

Figure 1:
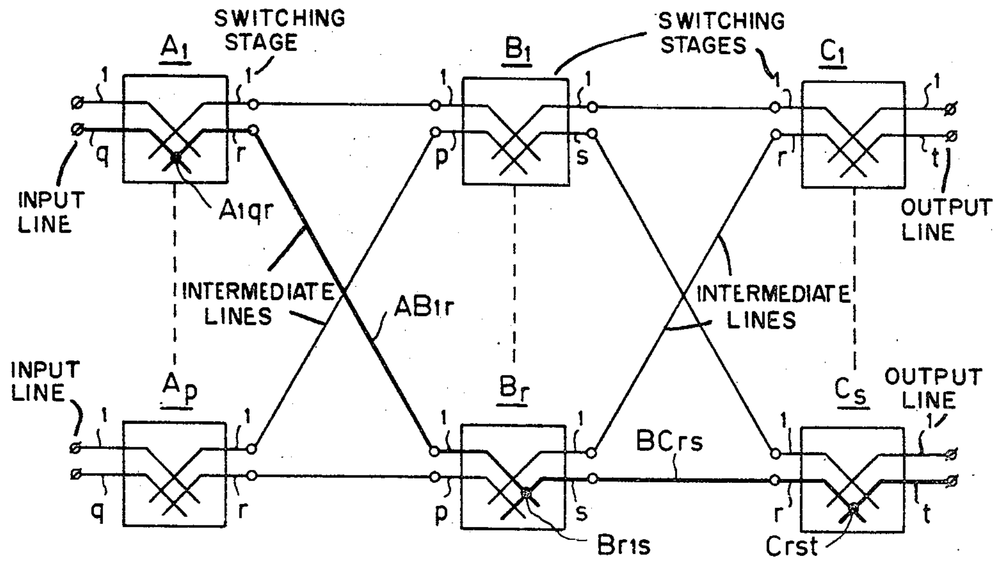
FIG. 1 shows the diagram of the connections in a simple three-stage switching network.

FIG. 1 shows a three-stage switching network comprising the switching stages A, B and C. Each of these switching stages comprises a plurality of identical cross point switches, each comprising a plurality of inputs and outputs. For example the switching stage A comprises the switches A*l*–A*p*, the switching stage B the switches B*l*–B*r* and the switching stage C the switches C*l*–C*s*. The switches of the switching stage A comprise each *q* inputs and *r* outputs. These inputs form at the same time the inputs of the switching network. Each A-switch in the switching network shown by way of example is connected through an intermediate line to each B-switch. The switching stage B thus comprises *r* B-switches, each having *p* inputs. The B-switches have each *s* outputs and each B-switch is connected through an intermediate line with each C-switch. The switching stage C comprises therefore *s* C-switches, each having *r* inputs. Each C-switch has *t* outputs, which form the outputs of the switching network. In the switching network thus built up each input can reach each B switch and the latter can reach each C switch. In this manner a plurality of connection paths can be established between each input and output of the switching network, each path being composed of two intermediate lines, i.e., one intermediate line between the switching stages A and B and one intermediate line between the switching stages B and C.

FIG. 1 shows the cross point switches only diagrammatically. In each cross-point switch each incoming line crosses each outgoing line in a cross point. For example in the A-switch A*l* an incoming line connected to the *q*th input, crosses the outgoing intermediate line connected to the *r*th output at the cross point A*lqr*, which is indicated by a dot. To each cross point a plurality of cross-point contacts are added, which serve for the multi-wire through-connection of the lines crossing each other at the crossing point concerned. Two of these cross-point contacts serve for the through-connection of the *a*- and *b*-wires of the crossing lines. These contacts are omitted from the figure for the sake of simplicity.

The cross-point contacts are for example reed contacts, sealed in glass protecting tubes. A cross point through-connection member comprises here three reed contacts of this kind, having a common coil, which surrounds the protecting tubes and serving for the control of the contacts by direct magnetic action.

Figure 2:
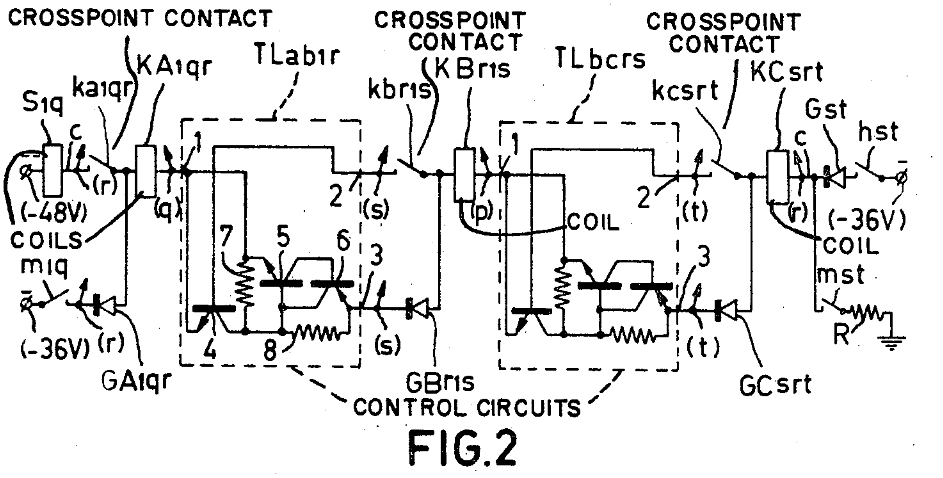
FIG. 2 shows the circuit diagram of the *c*-wire for a connection path between an input and the output of the three-stage switching network.

FIG. 2 shows the circuit diagram of the *c*-wire for one of the possible connection paths between the *q*th input of the switch A*l* and the *t*th output of the switch C*s*. The *c*-wire portion of all possible connection path forms the means for finding, selecting, connecting and holding the connection paths between each given input and each given output of the switching network. FIG. 2 shows by way of example the connection path in the connection diagram of FIG. 1 through the cross points indicated by dots and heavy lines: A*lqr* of switch A*l*, B*rls* of switch B*r* and C*srt* of switch C*s* and the intermediate lines AB*lr* and BC*rs*. It is assumed that line current circuits of subscriber lines are connected to the inputs of the switching network, said lines including each a separation relay S and that trunk circuits are connected to the outputs of the switching network, said trunk circuit having each a holding contact *h* for holding the relevant connection path.

The *c*-wire extends from a point of constant potential (−48 v.) through a winding of the separation relay S*lq* to the *q*th input of switch A*l* and from there through the cross-point contact *kalqr* and the subsequent cross-point coil KA*lqr* to the *r*th output of the switch. A marking circuit extends from a point of constant potential (−36 v.) through a marking contact *mlq* to the *q*th input of switch A*l* and from there through a diode GA*lqr* to the junction between the cross-point contact *kalqr* and the cross-point coil KA*lqr*. At the input and the output of the A-switch multiple signs in the form of arrows are indicated. The index *r* between brackets at the multiple points indicates that at these points *r* cross-point circuits corresponding to the *r* outputs attainable through the relevant input are connected. The index *q* at the output multiple point indicates that their *q* cross-point circuits are connected, which correspond to the *q* inputs leading to the relevant output. From the *r*th output of switch A*l* the *c*-wire passes through an intermediate-line circuit TL*ablr*, which forms part of the intermediate line AB*lr* from the input 1 thereof to the output 2 through the emitter-base junction of an n-p-n transistor 4. From the output 2 the *c*-wire passes to the firs input of the switch B*s* and from there through the cross-point contact *kbrls* and the subsequent cross-point coil KB*rls* to the *s*th output of switch B*s*. A marking circuit passes from the input 1 of the intermediate-line circuit TL*ablrs* to the output 3 thereof through the intercoupled transistors 5 and 6 and the resistors 7 and 8. From the output 3 the marking circuit extends through the diode GB*rls* to the junction between the cross-point contact *kbrls* and the cross-point coil KB*rls*. The course of the *c*-wire and of the marking circuit is repeated in quite the same manner in the next-following stage from the *s*th output of switch B*r* to the *r*th input of switch C*s* and from there via the cross-point C*lsrt* to the *t*th output of switch C*s*. From this output the *c*-wire passes through a diode G*st* and a subsequent make contact *hst* to a point of constant potential (—36 v.). A marking circuit passes from the *t*th output of switch C*s* via a marking contact *mst* and a subsequent resistor R to earth.

First the operation of the identical intermediate-line circuits will be explained. The portion of the intermediate-line circuit between the input 1 and the output 3 is a circuit having a negative resistance characteristic formed by two transistors 5 and 6 of opposite conductivity type, which are coupled crosswise. If an increasing voltage is applied between the output 3 and the input 1 said voltage being positive on the side of the output 3 and negative on the side of the input 1, such a current will be passed, when a given voltage value is attained (ignition voltage), that the two transistors become saturated and the voltage will drop to a very low value (burning voltage). The voltage at which current is conducted, i.e., the ignition voltage, may be varied by a variation of the ratio between the resistors 7 and 8, so that it can be adjusted to a desired value. When the intermediate line is occupied, a positive current passes from the output 2 to the input 1 and saturates the transistor 4. The emitter of the transistor 5 is connected to the emitter of the transistor 4 and the base of the former is connected to the collector of the latter. By a suitable choice of the types of transistors, it is achieved that the transistor 5 remains cut off when the transistor 4 becomes saturated.

The connection path shown in FIG. 2 is in the rest position, which is indicated by the open state of all cross-point contacts. For selecting and connecting a connection path between the *q*th input of switch A*l* and the *t*th output of switch C*s*, the marking contacts *mlq* and *mst* at the input and the output respectively of the switching network are closed. Thus, between the input and the output of the switching network a plurality of uninterrupted marking circuits are closed, which correspond to the plurality of possible connection paths between the input and output concerned and composed each of the marking circuits described above associated with the input and output of the switching network and the intermediate lines. These uninterrupted marking circuits have a resistor R in common, so that they influence each other. Be it assumed that the intermediate-line circuits TL*ablr* and TL*bcrs* of FIG. 2 are ignited after the marking contacts have been closed, so that the current of the marking circuit increases strongly and the voltage drops to the sum of the burning voltages. The voltage across the other uninterrupted marking circuits is then too low for igniting. The probability that two or more uninterrupted marking circuits ignite simultaneously is negligible due to the unavoidable small discrepancies between these circuits. The current of the ignited, uninterrupted marking circuit flows through the cross-point coils KC*srt*, KB*rls* and KA*lqr*. These coils are thus energized and switch on the connection by closing the associated cross-point contacts. Closing the cross-point contacts indicated in FIG. 2 and opening of the marking contacts *mlq* and *mst* and closing of the holding contact *hst* provide an uninterrupted holding current circuit from the point of constant potential (—36 v.) at the output of the switching network to the point of constant potential (—48 v.) at the input thereof. In this holding current circuit the separation relay S*lq* attracts so that the calling condition of the subscriber input line circuit is terminated when a connection path is established to the subscriber line circuit. A busy connection path has a potential lying between —48 v. and —36 v. The potential of a marked connection path lies between —36 v. and earth. The diodes associated with the cross-points are polarised so that the marking potential of a marked connection path cannot penetrate into a busy connection path. The intermediate-line circuits included in a busy connection path are cut off so that the potential of a busy connection path cannot penetrate into free connection paths. Thus a complete decoupling is obtained between the busy connection paths and the connection paths that may still be marked.

In practice the intermediate-line circuits TL*ab* between the switching stages A and B are incorporated in the B-switches and the intermediate-line circuits TL*bc* are incorporated in the C-switches. The intermediate-line circuits form a structural unit with said switches. The *c*-wire portion of the connection paths serving for finding, selecting adjusting and holding of the connection paths thus forms a truly one-wire network.

What is claimed is:

1. A control circuit for a switching network of the kind including a plurality of switching stages, each stage having a plurality of crosspoint switches, each cross-point switch having a plurality of input terminals and a plurality of output terminals and switch means for connecting any input terminal to any output terminal, and stage interconnecting means for connecting each output terminal of each cross-point switch to an input terminal of a separate cross-point switch of the next succeeding stage, whereby a plurality of channels occur between each input terminal of each cross-point switch of the first stage and each output terminal of each cross-point switch of the last stage, said control circuit comprising a relay corresponding to each said switch means of each of said cross-point switches, each relay comprising a coil and control contacts, a plurality of negative resistance means for interconnecting the relays of each stage with the relays of the next stage whereby the coils of relays corresponding to a given channel are serially connected, means preventing conduction in each negative resistance means when the relay connected at one end thereof is energized, a source of a marking voltage, means applying said marking voltage between the relays of the first and last stages whereby current can flow through the relay coils corresponding to an unoccupied channel and energize the corresponding relays, and means for bypassing said negative resistance means connected to relays corresponding to an occupied channel.

2. The control circuit of claim 1 wherein one end of each coil of each relay is connected to one terminal of the contacts of the respective relay, comprising means for connecting said negative resistance means between the other ends of the coils of the relays of each stage and said one end of the coils of the relays of the next stage.

3. The control circuit of claim 2 wherein said bypassing means comprises means responsive to the closing of said control contacts for bypassing the negative resistance means connected to the respective relay.

4. The control circuit of claim 3 wherein said negative resistance means comprises first and second transistors having their emitter collector path and base-emitter path respectively connected between first and second terminals, and resistance voltage divider means connected between said first and second terminals and having a tap connected to the base of said first transistor and collector of said second transistor, means connecting said first terminal to said other end of a coil of one stage, and means connecting said second terminal to said one end of a coil of the next stage.

5. The control circuit of claim 4 wherein said switch means comprises a third transistor having its base connected to the other terminal of the contacts of the respective relay of said next stage, and means for connecting the collector-emitter path of said third transistor in parallel with the base-emitter path of said first transistor.

6. The control circuit of claim 4 comprising a source of a holding voltage, and means applying said holding voltage between the relays of said first and last stages, and said means connecting said second terminal to said one end of a coil comprises diode means, whereby said diode means is cutoff when said holding voltage is applied to an energized channel.

References Cited

UNITED STATES PATENTS

| | | |
|---|---|---|
| 3,311,708 | 3/1967 | De Kroes. |
| 3,395,253 | 7/1968 | Warman. |

KATHLEEN H. CLAFFY, Primary Examiner

W. A. HELVESTINE, Assistant Examiner